Figure 1:
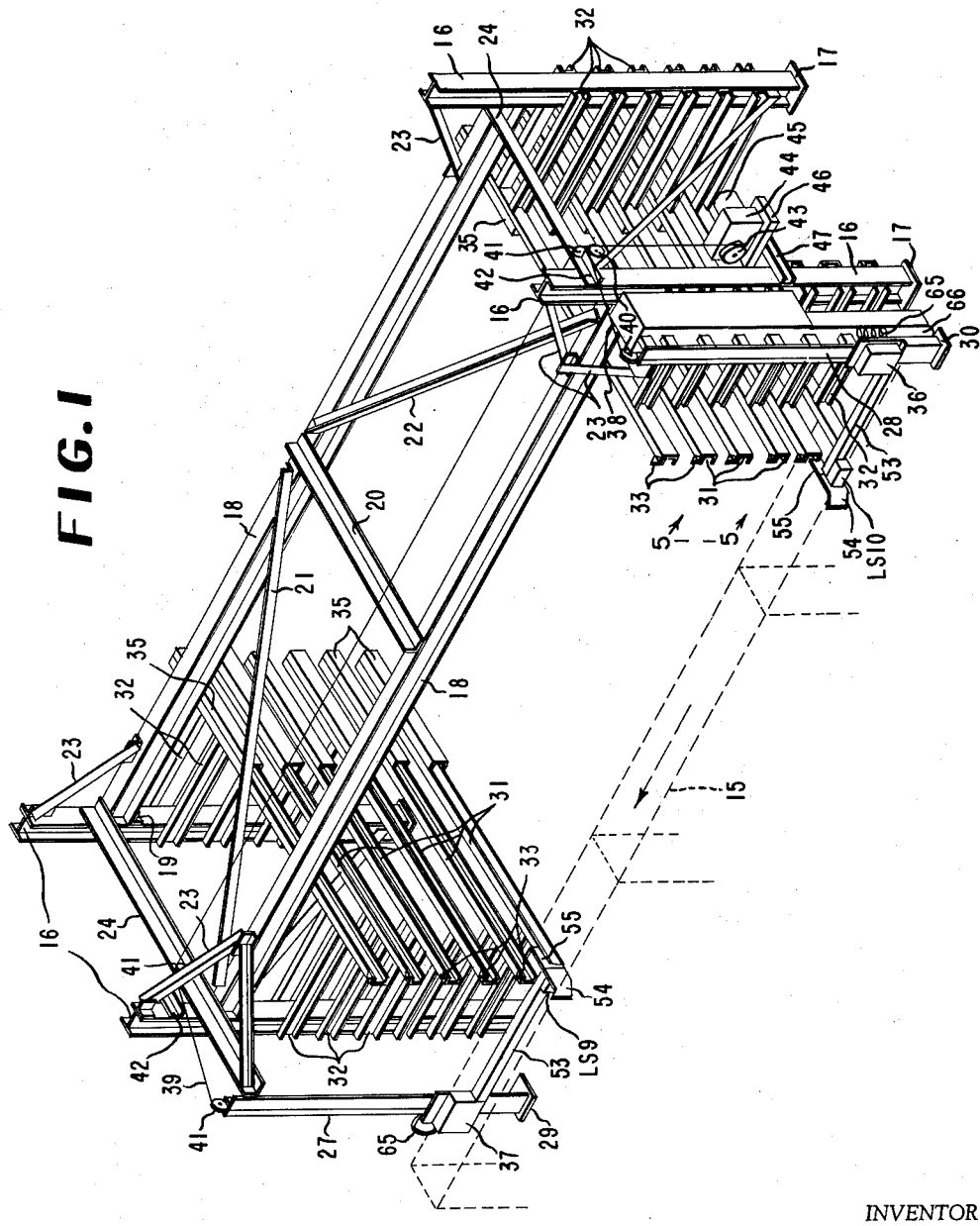

April 30, 1963 A. A. CORNELL ETAL 3,087,634
PIPE RACK
Filed Feb. 11, 1960 4 Sheets-Sheet 1

INVENTORS
ARTHUR A. CORNELL
WARREN B. GODBOLD

BY Harry J. McCauley
ATTORNEY

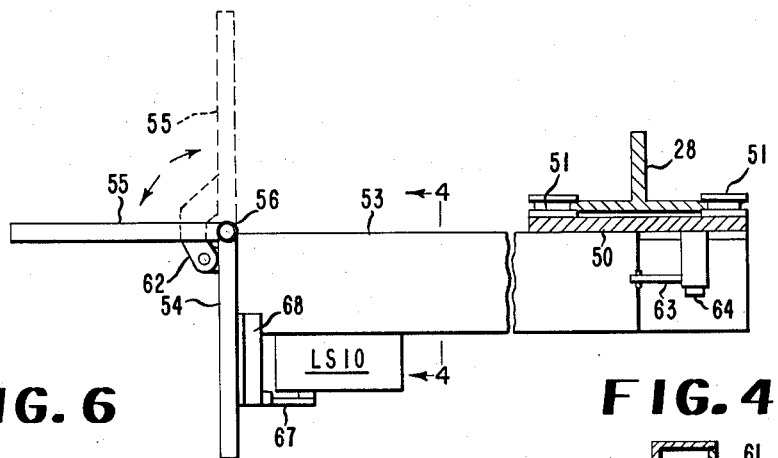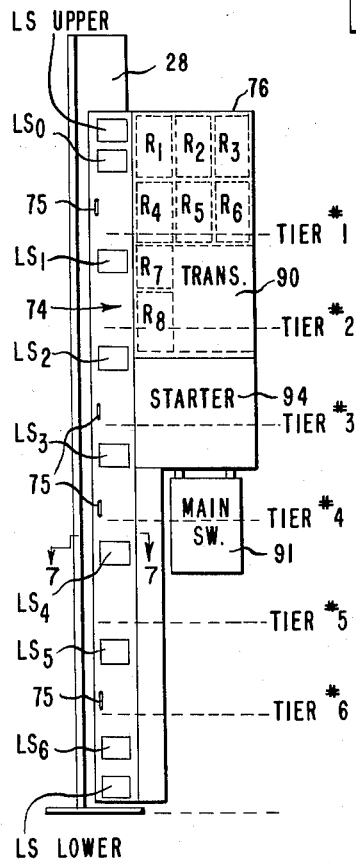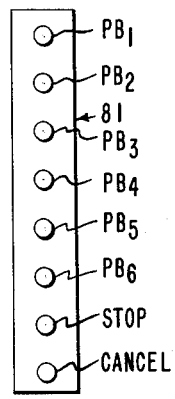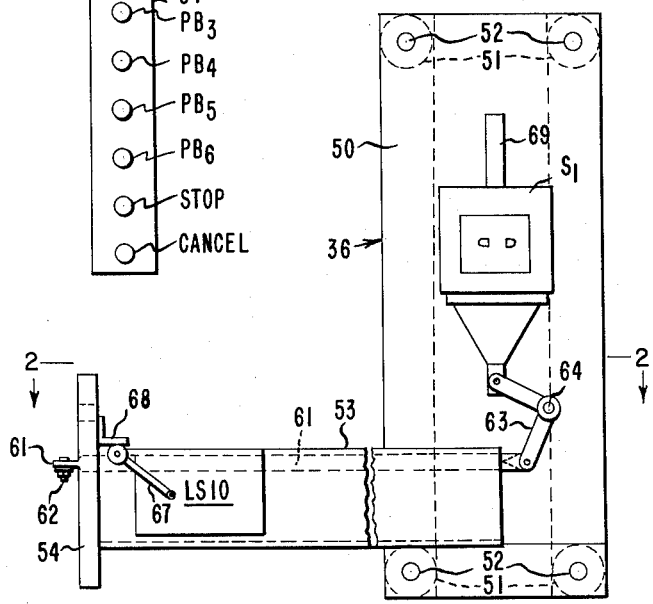

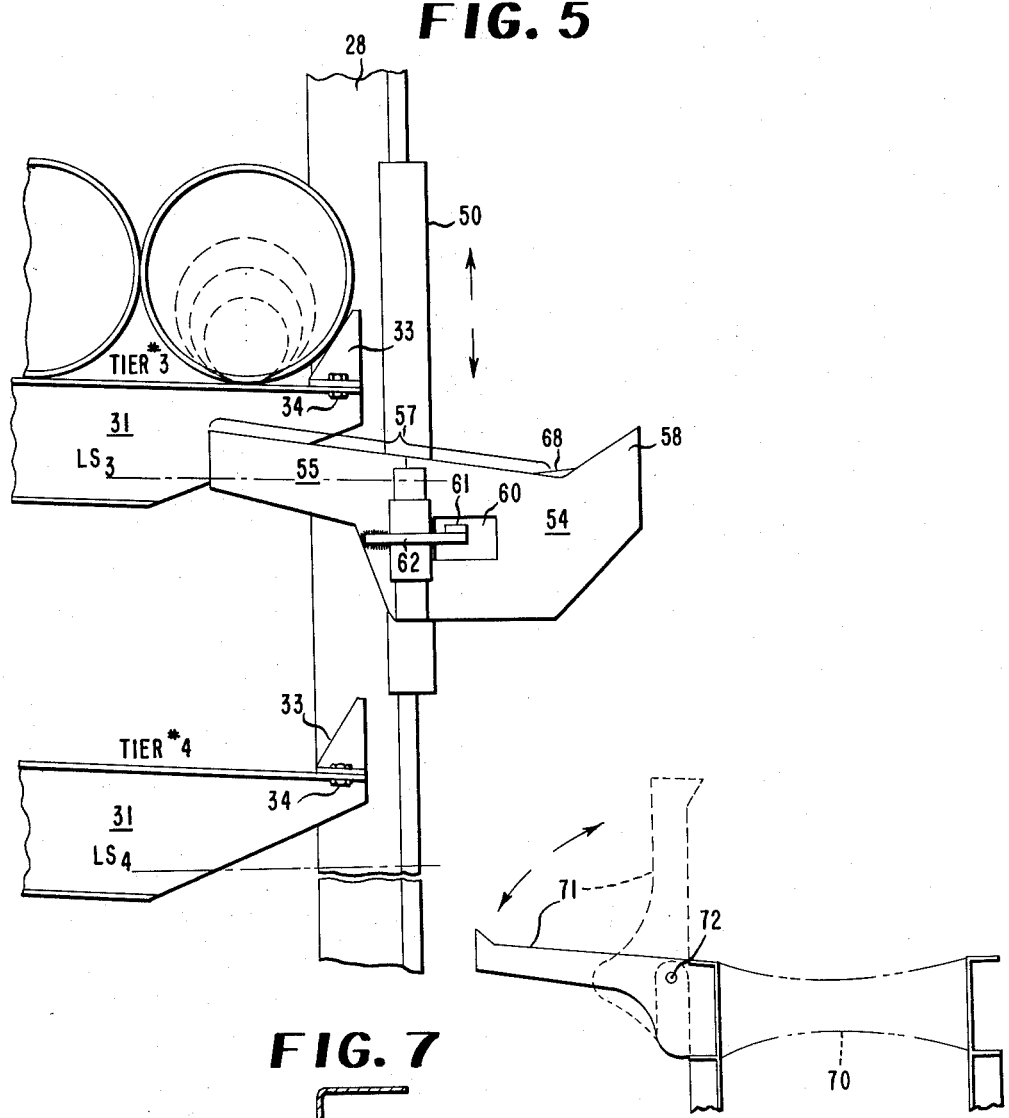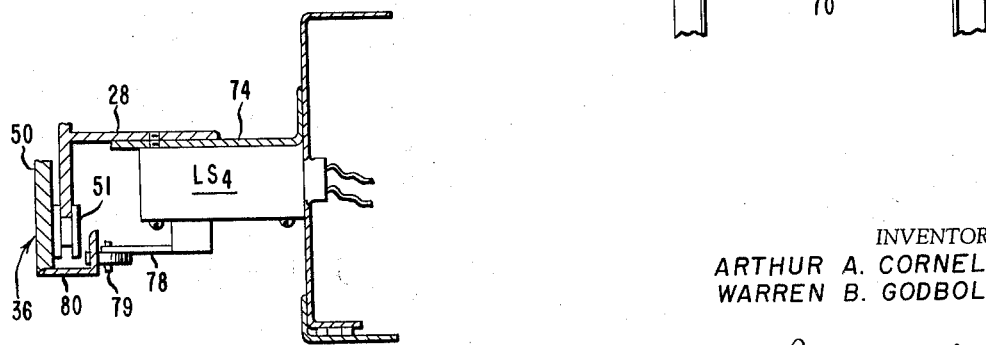
FIG. 5
FIG. 7
INVENTORS
ARTHUR A. CORNELL
WARREN B. GODBOLD
BY *Harry J. McCauley*
ATTORNEY April 30, 1963 A. A. CORNELL ETAL 3,087,634
PIPE RACK
Filed Feb. 11, 1960 4 Sheets-Sheet 4

INVENTORS
ARTHUR A. CORNELL
WARREN B. GODBOLD

BY Harry J. McCauley

ATTORNEY

United States Patent Office 3,087,634
Patented Apr. 30, 1963

3,087,634
PIPE RACK
Arthur A. Cornell, Wilmington, Del., and Warren B. Godbold, Richmond, Va., assignors to E. I. du Pont de Nemours and Company, Wilmington, Del., a corporation of Delaware
Filed Feb. 11, 1960, Ser. No. 8,033
3 Claims. (Cl. 214—16.4)

This invention relates to a pipe rack, and particularly to a pipe rack provided with means for the automatic withdrawal of one or more pipe lengths selectively from a given tier of the rack followed by delivery of the pipe to a predetermined discharge point.

The pipe rack of this invention is particularly advantageous for the segregated storage of pipe in accordance with size and type, different tiers of the rack being preferably reserved exclusively for a given size or type of pipe. Great labor savings in pipe handling are possible with such racks, especially in uses involving the standard individual pipe lengths of approximately 20 feet and pipe sizes of 2 inches nominal diameter or larger, as to which the weights become so great as to necessitate the use of overhead cranes, with all the attendant expense and inconvenience due to intermittent demand as well as the constant danger of personal injury accompanying operation. One especially productive utilization of the pipe rack of this invention has been on construction sites wherein relatively large amounts of pipe are utilized rapidly during the construction phase, as by cutting and joining to fittings or other lengths in the course of fabrication activity conducted by the pipe shop. In such uses it is desirable that provision be made for readily dismantling the pipe rack for transportation to another site where it can be re-erected with a minimum of labor and restored to service at its new location.

An object of this invention is to provide a pipe rack adapted to the segregated storage of pipes with automatic withdrawal and delivery upon demand. Another object of this invention is to provide a rugged design of pipe rack particularly adapted to outdoor field service in construction activity. Yet other objects include the provision of a pipe rack fabricated from standard structural steel forms which is relatively low in first cost and maintenance and which can be speedily dismantled for transportation to a new location and there re-erected with only ordinary precautions against misalignment of the components. The manner in which these and other objects of this invention are attained will become evident from the detailed description and the following drawings, in which:

FIG. 1 is a partially schematic perspective view of a preferred embodiment of pipe rack according to this invention which is shown empty of pipes for improved clarity, FIG. 2 is a sectional view taken on line 2—2 of FIG. 3 with the normal position of the pipe removal member indicated in full line representation and in transfer position in broken line representation, FIG. 3 is a front elevation of the right-hand elevator trolley of the pipe rack of FIG. 1 with the pipe removal member shown solely in pipe transfer position, FIG. 4 is a sectional view taken on line 4—4, FIG. 2, with all structure on the end of the arm omitted, FIG. 5 is a sectional view taken on line 5—5 FIG. 1, showing the front end details of two rack tiers, the upper of which is represented as reserved for 6" pipe, three smaller sizes being inscribed within the front pipe length to better illustrate the necessary setting of the stops, the pipe elevator in pipe removal position, and the pipe removal ramp of the associated conveyor.

Figure 8:
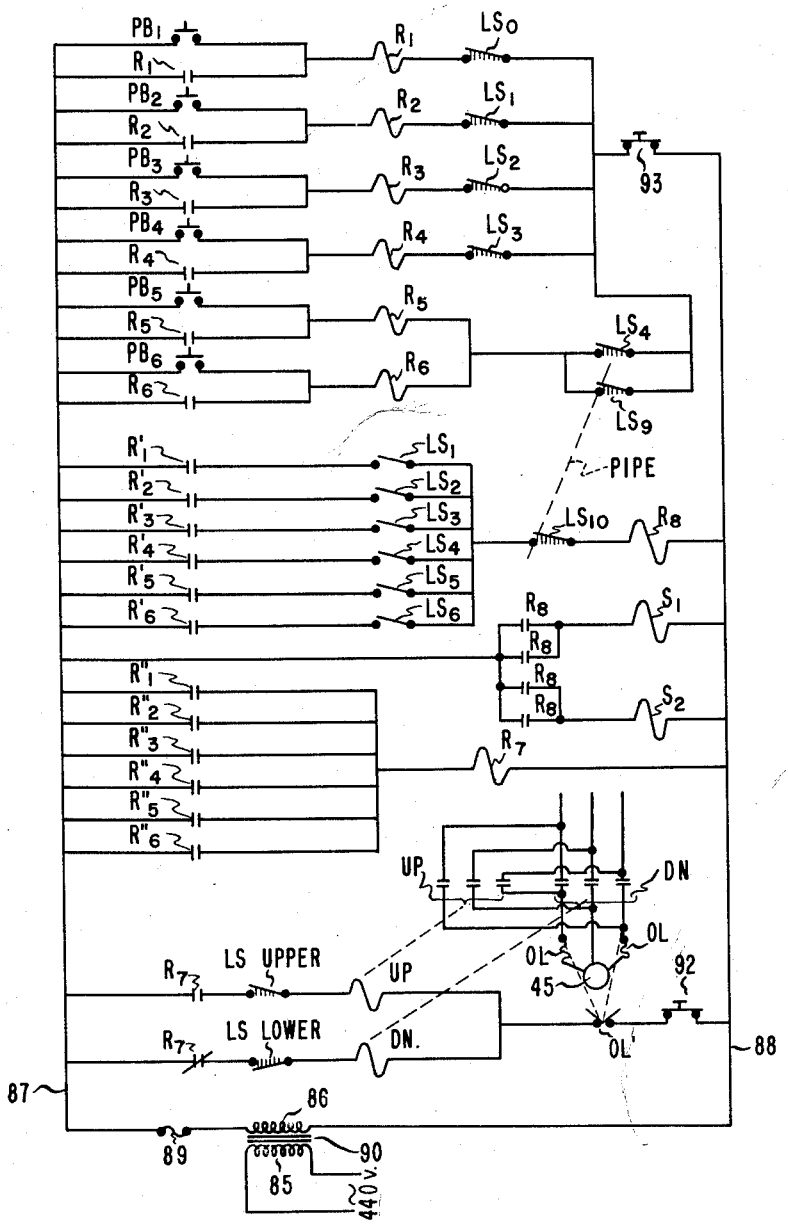

FIG. 6 is a side elevation view of the mounting board upon which are mounted the several limit switches in their precise relationship one to another, the locations of the forward ends of adjacent tiers being indicated in broken line representation, FIG. 6a is a front elevation of the push button panel utilized for control of rack operation, FIG. 7 is a sectional view taken on line 7—7, FIG. 6, and FIG. 8 is a schematic representation of the electrical control circuit.

Generally, the pipe rack of this invention comprises the combination of a rigid frame supporting a plurality of coparallel rails arranged in opposed pairs at any given level and separated vertically a sufficient distance to provide a number of superposed tiers, the rails being all inclined downwardly from the rear to the front of the rack so that pipe lengths placed thereon roll by gravity to the front end of the rack, stops at the front ends of the rails barring accidental dislodgement of racked pipes from the rails, elevator means traversing the front height of the rack closely adjacent to the front ends of the tiers, pipe transfer means adapted to effect discharge of at least single lengths of pipe from a preselected tier to the elevator means, and control means co-ordinating travel of the elevator means with actuation of the pipe transfer means to effect delivery of pipe from a preselected one of the tiers to the elevator means when the elevator means is disposed adjacent to the tier and thereafter cause the elevator means to return to a predetermined base position.

Referring to FIG. 1, there is shown a partially schematic perspective view, looking towards the front, of a preferred embodiment of this invention utilizing a reversible type elevator mechanism in a 6-tier construction. This rack is intended for use in conjunction with a conventional roller conveyor, powered or gravity, which is disposed as indicated in broken line outline at 15 and which delivers the pipe in the direction of the arrow to the pipe fabrication facilities located more or less remotely from the rack.

The framework of the rack consists of four principal uprights, which can typically be 6" wide flange 10' long H columns 16 which are each provided with anchor plates 17 welded thereto adapted to be bolted to anchor bolts, not shown, integral with suitably level concrete footings, also not shown. It is preferred to employ a single concrete footing for the common support of both uprights 16 on one side of the framework, and, since considerable weight must be supported without shifting of the structure, it is preferred to employ rather substantial footings, which, typically are 2 ft. wide x 10 ft. long and of a depth of about 1'4", of which the emplaced depth in the earth is preferably 1 ft. Any location having a soil bearing stability of about 1500 lbs./sq. ft. or greater is satisfactory for a rack location and, of course, the concrete footings should be poured and allowed to age a proper time in advance of erection of the framework thereon. Uprights 16 are stayed by a pair of longitudinal H columns 18 which can typically be 8" wide flange members 23 ft. long bolted to uprights 16 through the agency of clips 19. Cross bracing is provided by bolted angle irons 20, 21 and 22 and corner bracing 23, whereas end bracing is provided by angle irons 24, which are extended forwardly on the front side of the rack to provide a pin support for the two vertical T-cross section steel rails 27 and 28 along which the elevator mechanism travels. Although the left-hand elevator rail 27 is shown somewhat out of prolongation with the left-hand uprights 16 to better reveal the details of rack construction, it is intended that both rails be attached to the common footings on each side of the framework by anchor bolts, not shown, engaged with anchor plates 29 and 30 welded securely to rails 27 and 28, respectively.

The twelve pipe supporting rails 31 can typically be 4" channel members about 10 ft. long which are supported inwardly of uprights 16 by bolted attachment to cantilevered struts 32 about 3'3" long, two of which are provided at each end of the rails. Struts 32 are welded in invariant positions to uprights 16, opposite pairs referred to the longitudinal direction of the rack being in substantial alignment; however, the front struts are disposed at a lower level than the rear struts to provide downward inclination of rails 31 from rear to front of about ½" per ft., which has proved ample to insure rolling gravity feed of the pipes to the front face of the rack. The rails are provided at the front ends with stops 33, shown to largest scale in FIG. 5, which are adjustably mounted on rails 31 by bolts 34 engaging with holes spaced along the rails at predetermined intervals, so that the center lines of all sizes of pipe to be used with the rack always lie in a common vertical plane. Such a disposition of pipes is indicated by the inscribed circular limit lines for 2", 3" and 4" pipes, respectively, for tier No. 3, FIG. 5. The vertical interspacing of rails 31 is preferably equal, and about 1 ft. intervals affording about 8" clearance has proved adequate for the usually encountered pipe sizes which are required in large amounts. It will be seen that opposed pairs of rails 31 thus constitute a tier disposed at a unique vertical level for the storage of pipe lengths, struts 32 providing support inwardly of the ends of the pipes to prevent their bowing under their own weights while still affording complete freedom of pipe movement in a direction transverse the rack.

Although not essential to operation, it is convenient to utilize short length rail extensions slid in at will within the rear channel boxed portions 35 of opposed rails 31, which then constitute temporary ramps facilitating the loading of individual tiers by affording clearance with respect to the rear uprights 16. Pipe can thus be readily loaded into the rack from a lift truck or crane maneuvered into position on the rear side, which remains completely accessible, and it is preferred as hereinafter described to segregate pipe of given sizes or types in individual tiers.

The elevator mechanism, refer FIGS. 1-4, comprises two trolley carriages 36 and 37 identical in design, but with orientations reversed, so that the left-hand one 37 is the mirror image of the right-hand one detailed, the former of which is adapted to track along rail 27 whereas the latter tracks on rails 28. The trolleys are suspended level with one another in a horizontal plane at one end of wire ropes 38 and 39, respectively, which are trained over directional sheaves 40 for rope 38 and 41 for rope 39, so that the ropes are maintained in substantial parallelism with rails 27 and 28 at all times. The other ends of ropes 38 and 39 are fixedly attached to spool 43 power-driven through speed reducer 44 by electric motor 45. Motor 45 can typically be a 440 v. ¾ H.P. 1725 r.p.m. reversible type driving through a 200 to 1 reduction ratio speed reducer 44, thereby obtaining a trolley speed of about 4"/sec., equivalent to a maximum cycle period of elevator travel to the most remote of the 6 tiers, followed by return to base position, of 45 secs., which proved satisfactory in practice.

Both motor 45 and speed reducer 44 are mounted by bolt attachment to a bed plate 46 integral with a pair of struts 47 welded at the end opposite the bed plate securely to the front right-hand upright 16.

Referring to FIGS. 2 and 3 particularly, each trolley comprises a face plate 50 provided on the inside at all four corners with individual doubly flanged guide wheels 51 journaled for free rotation on stub shafts 52 attached to plate 50 by screw threads, or in other conventional manner not detailed. Guide wheels 51 are adapted to abut centrally the opposite vertical edges of the T-cross section rail 28, or its counterpart 27 for trolley 37, whereupon the flanges lock the face plate against removal from the rail while still permitting free travel of the trolley longitudinally thereof. To insure smoothness of operation it is preferred to machine flat ways along the edges of the rails against which guide wheels 51 bear, to minimize wobble and friction in the course of travel of the trolleys over the full lengths of the rails.

At the lower ends, face plates 50 are provided with rigid arms 53 which are preferably hollow to enclose and protect the linkage hereinafter described and which can conveniently be made up of a pair of opposed angle iron members 53a and 53b welded together along the edges to form a rectangular box-like structure as shown in cross section in FIG. 4. The pipe transfer means are mounted at the inward ends of arms 53 and, in this embodiment, comprise a stationary base piece 54 welded securely across the end provided with an arcuately movable member 55 secured thereto by hinge pin 56.

As indicated in FIG. 1, but shown to larger scale in FIG. 5, the upper edges of base piece 54 and member 55 when in prolongation constitute a smooth way 57 inclined downwardly in the same direction as pipe-supporting rails 31 but at an even steeper slope, so that pipes engaged by members 55 in their upward travel will continue to be urged forwardly by gravitational force and thus eventually transferred to the elevator as soon as stops 33 are cleared. The opposite ends of base pieces 54 are terminated in raised protuberances 58 of reversed slope, so that pipes transferred out of the tiers will come to stable equilibrium within the notches created and will rest therein until removed by the positive action of the conveyor ramp hereinafter described.

Movable members 55 have two positions of rest, the normal one being that indicated in full line representation in FIG. 2, wherein the members lie in substantial prolongation with arms 53 completely clear of the front ends of rails 31 and any pipes stored thereon in any of the superposed tiers, and the other position, indicated in broken line representation, being 90° clockwise therefrom as viewed from the top, whereupon the ends of members 55 are disposed athwart the plane including the center lines of the frontmost pipes and well inwards of their center lines (refer FIG. 5), so as to effectively replace rails 31 as the supports for the first pipe length in order and thereby effect withdrawal during ascension of trolleys 36 and 37.

Actuation of member 55 to either of its two positions is effected by a link 61 (FIGS. 3 and 5) passing through hole 60 cut in 54, pinned at its outer end to a lug 62 welded to 55 and at its inner end to one arm of a bell crank 63 journaled on a pin 64 secured to face plate 50. The other arm of the bell crank is pinned to the plunger of solenoid $S_1$ ($S_2$ for trolley 37), which is mounted on face plate 50 and preferably enclosed within a protective shielding housing as indicated generally in FIG. 1, but which housing has been dispensed with in FIGS. 2 and 3 to better show the details of construction. Solenoids $S_1$ and $S_2$ are preferably of the type incorporating arms 69 adapted to be weight loaded appropriately so that restoration of members 55 to normal position in prolongation of arms 53 occurs under the influence of gravity and thus requires no power, whereas rotation of the members to pipe-receiving position is effected by positive power application to the coils of the solenoids as hereinafter described. Extensible electrical power supply and circuit connection cables 65 (FIG. 1), coiled within shielding receptacles 66 attached to the lower ends of rails 28 and 27 connect the solenoids to a power source, such as the usual 115 v. 60 cycle A.-C. lighting circuit or the equivalent. Finally, each arm 53 is provided with a limit switch LS10 (LS9 for trolley 37), the actuation arms 67 of which are provided with angle iron tabs 68 which extend slightly above way 57 (FIG. 5) and are thus adapted to be depressed when the pipe lengths come to rest in the notches of base pieces 54, thereby breaking an electrical circuit through the switches and associated circuit conductors not detailed in FIGS. 2 and 3 but which preferably are enclosed within the cables 65 for compactness.

The vertical relative orientations of the principal cooperating components of the pipe rack are depicted in FIG. 5, it being understood that the components interposed within the vertical projection of a neighbor are offset horizontally an appropriate distance so as not to cause interference with one another during ascent or descent of trolleys 36 and 37 but only to effect contact with the undersides of the pipe lengths, thereby effecting transfer sequentially from a given tier to the elevator and thence to the conveyor 70. While not part of this invention, it is convenient to provide a pair of downwardly inclined ramp pieces 71 pivotally secured by pins 72 to conveyor 70 so as to be rotatable in a vertical plane out of the path of any pipe lengths being elevated from below the conveyor. Ramps 71 are preferably provided with biasing springs, not detailed, for quick return of the ramps to their normal position shown in full line representation in FIG. 5, although the weight distribution of the ramps is such that gravity return is equally feasible. Ramps 71 are adapted to receive lengths of pipe from the elevator in the course of elevator return to base position and roll them by gravity onto conveyor 70, from whence they travel on to the pipe shop or other place of utilization in a direction in prolongation with the pipe longitudinal axes.

Referring to FIG. 6, which shows the relative orientation of the several electrical control auxiliaries, there is provided a unitary mounting board 74 which is adapted to have mounted fixedly thereon in precise spacing from one another the nine spring return limit switches LS Upper, LS0–LS6, inclusive, and LS Lower. With the typical 12″ interspacing between tiers (and tier No. 6 being spaced 12″ above base position) the several limit switches were located 3¼″ below the front ends of their associated rails 31 in all cases. LS Upper, LS0, LS5, LS6, LS9, LS10, and LS Lower are conventional single circuit limit switches; however, LS$_1$–LS$_4$, inclusive, are of the two-circuit type, such as the National Acme Co. "Snap-Lock," which are provided with two independent pairs of contacts, one pair of which is open when the other pair is closed. Board 74 is provided with slots 75 for screw attachment with the flange of rail 28, so that the board can be readily detached as a unit when the rack is dismantled without disturbing the accurate spacings of the limit switches. As a measure of convenience it is preferred to consolidate all electrical equipment by attachment to board 74 and, accordingly, on the right-hand side indicated generally at 76 are mounted the several control relays, R$_1$–R$_8$, inclusive, the transformer 90 supplying the control circuit current, if such a transformer is used, the starter 94 for motor 45 and any other auxiliaries, such as a main disconnect switch 91. The push button control panel 81, FIG. 6a, mounting the six individual tier selection push buttons PB1–PB6, respectively, is preferably disposed in the pipe fabrication shop at a point, such as the pipe cutting machine, with which the pipe fabrication process commences. Control panel 81 also includes a "Stop" push button, which operates normally closed switch 92 of conventional design, and thus not detailed, in series with both the "Up" and the "Down" relays, thereby serving as a power cut off switch in the event of emergency. Finally, there is provided a "Cancel" push button operating normally closed switch 93 in series with LS$_0$–LS4 (and LS9), this switch permitting the operator to interpose a reverse signal at any time during ascent of the elevator toward any of the several tiers, thereby, in effect, cancelling any previous order switched in via panel 81.

The detailed relationship of the limit switches LS Upper, LS0–LS6, and LS Lower with respect to trolley 36 is shown in FIG. 7. LS-4, which is identical in actuating mechanism design with all of the other limit switches mounted on board 74, has its actuating arm 78 provided with roller 79 disposed towards the rear side of face plate 50. A striker piece 80, which may conveniently be a small piece of angle iron located in appropriate vertical relationship with respect to the limit switches, is welded to the edge of face plate 50 so as to protrude across the common vertical line which all limit switch arms 78 are spring-biased to normally assume. Accordingly, elevator trolley 36 trips all limit switches encountered in sequence during its travel up and down rail 28 and thereby effects co-operation with the rack control circuit, which is hereinafter described with particular reference to the circuit diagram of FIG. 8.

In the typical design portrayed, power for the control circuit is derived through the transformer 90 having its primary winding 85 tapped into the 440 v. power supply leads running to motor 45, thereby supplying 110 v. 60 c. current through secondary winding 86 in circuit with lead 87 and neutral lead 88. A protective fuse 89 is provided adjacent winding 86.

Push buttons PB1–PB6, mounted on panel board 81 of FIG. 6a, are each connected in parallel with a set of normally open holding contacts R$_1$–R$_6$, respectively, each actuated by the identically numbered relay coils R$_1$–R$_6$, respectively, in series circuit with the push buttons and also with the normally closed contacts, indicated by subjacent shading of the several limit switches LS0 to LS4 (but in order of one number lower, except for PB6) hereinbefore described. For reasons hereinafter brought out, the push button circuits PB5—R$_5$ and PB6—R$_6$ are connected in parallel with each other through the normally closed contact pair of LS$_4$ which, in turn, is shunted by LS9, the normally closed limit switch carried by the left-hand arm of the elevator. Below this is a second set of six normally open relay contacts R$_1'$–R$_6'$, each connected in series with the normally open sets of contacts of the identically numbered limit switches LS$_1$–LS$_6$, respectively, and thence through normally closed LS10 on the right-hand elevator arm to relay coil R8. Solenoids S$_1$ and S$_2$ on trolleys 36 and 37, respectively, are connected in separate parallel circuit through paired normally open relay contacts R$_8$ to thereby distribute the current to safeguard against damage to the contacts. A third set of normally open relay contacts R$_1''$–R$_6''$ are connected in parallel with one another but individually in series with relay R$_7$ and, finally, there are the two parallel-connected limit-of-travel circuits individually incorporating normally closed LS Upper and LS Lower. The latter are individually in series with the "Up" relay and "Down" relay, respectively, which relays, together with their associated sets of three contacts each and the two thermal overload heaters OL depicted in the inset representation of the motor circuit, are part of the starter per se and are conventional. The thermal overload contact pair responsive to heaters OL are designated OL' in series with both LS Upper and LS Lower.

The convention of tier designation adopted in the following description of operation is in increasing order from the top of the rack to the bottom, thereby preserving consistency with the numerical designation of relays hereinbefore set out.

Two essentially different circuit connections must be established for the two different situations of withdrawal of pipe from a tier disposed above conveyor 70 and from a tier disposed below conveyor 70. In the typical design described herein in detail, the top of conveyor 70 lies between tier No. 4 and tier No. 5, i.e., between the fourth and fifth tiers counted from the top of the rack, as indicated generally in FIG. 1 but shown even more clearly in FIG. 5. In the circuit described, this discrimination is effected by employing as LS0–LS4 limit switches of the two-circuit design hereinbefore mentioned and for LS5 and LS6 those of single circuit design.

In operation, if it is assumed that the operator desires to remove a length of pipe from tier No. 3, i.e., the third tier from the top, he simply depresses PB3. At this instant the elevator is at base position at the bottom of the rack where it has opened LS Lower upon completion of its previous cycle of operation. Momentary closure of the contacts of PB3 immediately energizes relay R3, the power circuit for which is completed through the normally closed pair of contacts of LS2, thereby closing relay holding contacts R3 to maintain the circuit closed after the operator releases PB3.

Relay contacts $R_3'$ and $R_3''$ are immediately closed; however, since the normally open set of contacts of LS3 is at this moment open, the coil of relay R8 remains de-energized, even though LS10 is in its normally closed position. Closure of contacts $R_3''$ immediately energizes relay $R_7$, closing the circuit through normally closed LS Upper, thereby completing the "Up" circuit (and simultaneously breaking the "Down" circuit) in the starter of motor 45 as indicated by the broken lines, FIG. 8, whereupon the elevator trolleys 36 and 37 ascend in concert.

As will be apparent from FIG. 6, LS6, LS5 and LS4 are all tripped in the sequence named without any effect on members 55, which continue to remain in position in prolongation with arms 53, and non-interfering with any pipes in any of the tiers. LS3 is disposed intermediate tiers No. 3 and No. 4, so that it is next in turn to be tripped as the elevator rises, thus closing the normally open contacts LS3 in series with contacts $R_3'$. LS10 being in its normally closed position, relay R8 is thereupon immediately energized, which closes both pairs of parallel-connected contacts $R_8$ in series with $S_1$ and $S_2$, respectively. Members 55 then simultaneously turn to a position transverse the plane of pipe alignment, as seen in FIG. 5, well in advance of the point in time when the inmost ends of 55 reach the level of the upper edges of the rails 31 constituting tier No. 3. Continued ascent of the elevator brings ways 57 in abutment with the underside of the front pipe on tier No. 3, lifting it clear of stop 33, so that the pipe then rolls down 57 into the notch cut in 54 and opposite ends of the pipe both depress tabs 68, thus opening both LS9 and LS10. The immediate effect of this is to deenergize solenoids $S_1$ and $S_2$ by opening the $R_8$ contacts in series therewith, causing retraction of links 61 and the rotation of both members 55 into their original open positions in prolongation with arms 53.

As the elevator continues to rise, the normally closed contacts of LS2 are eventually opened and this immediately de-energizes R3, which is in series with this limit switch, concurrently opening contacts $R_3'$ and $R_3''$, the latter de-energizing relay $R_7$ and opening the $R_7$ contacts in series with LS Upper while closing the parallel-connected set in series with LS Lower. The "Up" relay in the starter is de-energized simultaneously with energization of the "Down" relay, causing the elevator to reverse and descend under power toward base position. When the elevator reaches ramps 71, the pipe length is automatically lifted clear of protuberances 58, whence it rolls by gravity onto conveyor 70 and is fed to the pipe cutting machine or other apparatus located in the direction indicated by the arrow of FIG. 1. The rack elevator continues its descent until trolley 36 trips LS Lower (refer FIG. 6) at which point the electrical circuit through the "Down" relay in the starter is opened and motor 45 halts, thus completing the cycle and all activity until the operator again presses one of the push buttons. It will be understood that, for orders made on tier No. 1, LS0 functions as the elevator reversing agency.

A somewhat similar mode of operation occurs when a pipe is to be withdrawn from either tier No. 5 or No. 6.

For purposes of illustration, if the operator wants pipe from tier No. 6, he depresses PB6. Relay R6 is immediately energized because both LS4 and LS9 are closed, thus closing the holding contacts $R_6$. Contacts $R''6$ close, thereby energizing R7 which closes contacts R7 in series with the motor starter "Up" relay (simultaneously opening those in series with the "Down" relay) and the elevator starts to ascend. Contacts $R'6$ are also closed at this time, thereby permitting the energization of R8 when the contacts LS6 in series with $R'6$ are eventually closed by the elevator ascent. This, in turn, energizes $S_1$ and $S_2$ to pivot members 55 into pipe-removing position and, as tier No. 6 is passed, the front pipe length thereon is transferred to the elevator and raised by it towards the upper level of conveyor 70. It will be noted that, although the pipe length opens both LS9 and LS10 when it strikes their associated tabs 68, the circuit through $R_6$ remains unbroken due to the fact that LS4 remains closed. Nevertheless, $R_8$ is de-energized and, with it, solenoids S1 and S2, thus turning members 55 out of position transverse the rack and into prolongation with arms 53. As indicated in FIG. 5, ascent of the elevator eventually causes the pipe length to abut ramps 71 which, however, rotate clockwise on their pins 72 until clear of the pipe, as indicated in broken line showing, and then snap back into their original positions under the actions of their associated biasing springs. Trolley 36 next trips LS4, the actuation arm 78 of which is disposed at the level indicated by broken line "LS4," FIG. 5, which then de-energizes relay R6, opening contacts $R_6''$ and de-energizing R7. The $R_7$ contacts in series with LS Upper open and those in series with LS Lower close, reversing motor 45 so that the elevator commences to descend. By this time the pipe lies above ramps 71 and these transfer it by gravity to conveyor 70. Removal of the pipe from tabs 68 closes both LS9 and LS10, but without effect, due to the fact that all circuits through the push button holding contacts are at this time open. Accordingly, the elevator continues to descend to base position, finally opening LS Lower and thus halting motor 45, to complete the cycle.

As hereinbefore mentioned, if the operator desires to cancel the action previously initiated by the depression of any of the buttons PB1–PB6, he can do so at any time prior to actual actuation of the limit switch associated with the particular tier on which the order was made by simply depressing the "Cancel" push button, thereby opening switch 93, which causes instant reversal of the direction of elevator travel and return of the empty elevator to base position.

The embodiment of this invention hereinbefore described in detail utilizes a reversible elevator; however, it will be understood that an endless chain type conveyor moving in only one direction could equally well be substituted if desired, although with some complications with respect to both the relative mounting of the limit switches and the electrical circuitry, thus making such an alternate design somewhat less preferred, although an increase in delivery speeds is thereby possible. Also, while the invention has been described as especially applicable to lengths of pipe, obviously the operation would be identical if the items supplied were round solid rods. Similarly, the invention is useful for the handling of steel structural forms and the like by either increasing the downward inclinations of rails 31 to insure gravity feeding, or even by providing friction belt feeders, or equivalent mechanisms for each tier to insure positive feed to the front face of the rack. Finally, although the apparatus described in detail is adapted to remove only one length of pipe at a time, it is obvious that with slight modifications it can be made to remove two or more lengths simultaneously, if this is desired.

From the foregoing, it will be understood that this invention can be varied in many respects by application of the skill of the art without departure from its essential spirit, and it is therefore intended to be limited only within the scope of the following claims.

We claim:
1. A pipe rack comprising in combination a vertical framework provided with a plurality of substantially co-parallel pipe-supporting rails fixedly attached to said framework and arranged in opposed pairs at common levels so that each of said pairs constitutes one of a plurality of superposed pipe storage tiers, said rails being inclined downwardly from the rear side towards the front side of said framework with a slope sufficient to effect gravity feed of pipe stored in said rack from rear to front within said tiers, stops attached to the front ends of said rails securely retaining any pipes disposed on said rails from accidental dislodgement from said tiers, powered elevator means for transporting at least one length of pipe away from a preselected one of said tiers during any one operative cycle of said elevator means disposed for movement in a vertical plane adjacent the front side of said framework but clear of the front ends of said tiers, pipe transfer means effecting transfer of pipe from a preselected one, and only from said preselected one, of said tiers to said elevator means, and control means actuating automatically said elevator means to travel through a cycle of movement from a predetermined base position to a preselected one of said tiers followed by return to said base position, said control means comprising a plurality of limit switches, one associated uniquely with each of said tiers, which, on preselection by the operator, actuate said pipe transfer means to effect said transfer of pipe from said preselected one of said tiers to said elevator means during the interval of time in which said elevator means is adjacent to said preselected one of said tiers and thereafter, in co-operation with the next-following limit switch encountered during movement of said elevator means, complete the cycle of elevator travel to said predetermined base position.

2. A pipe rack according to claim 1 wherein said pipe transfer means consists of individual arms fixedly secured to said elevator means and disposed with length dimensions aligned substantially parallel with the length of the rack and towards one another, said arms being provided with members responsive to said control means of a length proportioned, when in pipe transfer position, to extend inwardly of the rack past said stops a sufficient distance to remove any pipes abutting said stops while, in normal position, said members are oriented approximately 90° away from said pipe transfer position and in substantial prolongation with said arms.

3. A pipe rack comprising in combination a vertical framework provided with a plurality of substantially co-parallel pipe-supporting rails fixedly attached to said framework and arranged in opposed pairs at common levels so that each of said pairs constitutes one of a plurality of superposed pipe storage tiers, said rails being inclined downwardly from the rear side towards the front side of said framework with a slope sufficient to effect gravity feed of pipe stored in said rack from rear to front within said tiers, stops attached to the front ends of said rails securely retaining any pipes disposed on said rails from accidental dislodgement from said tiers, powered elevator means of reversible type for transporting at least one length of pipe away from a preselected one of said tiers during any one operative cycle of said elevator means disposed for movement in a vertical plane adjacent the front side of said framework but clear of the front ends of said tiers, pipe transfer means carried by said elevator means effecting transfer of pipe from a preselected one, and only from said preselected one, of said tiers to said elevator means, and control means actuating automatically said elevator means to travel through a cycle of movement from a predetermined base position to a preselected one of said tiers followed by return to said base position and actuating said pipe transfer means to transfer said length of pipe from said preselected one of said tiers to said elevator means during the interval of time in which said elevator means is adjacent to said preselected one of said tiers comprising a powered electrical circuit containing in mutually parallel connection as regards each pushbutton and each pair of relay contacts, individual electrical sub-circuits reserved to each of said tiers uniquely comprising, in series, a pushbutton switch, a relay and a normally closed limit switch, each of said relays being provided with three sets of contact pairs as follows: a first set of which constitutes a holding circuit connected in parallel with said pushbutton switch, a second set of which is in series electrical circuit, respectively, with a normally open limit switch reserved to each of said tiers uniquely, a relay having contacts in the power circuits of each of two solenoids actuating said pipe transfer means to said pipe transfer position, and at least one normally closed limit switch opening in response to completion of the pipe transfer operation, and a third set of relay contacts in series electrical circuit with a power supply relay raising or lowering said elevator means depending upon the position of said elevator means with reference to said preselected one of said tiers, the next-following one of said normally open limit switches reserved to each of said tiers uniquely encountered during movement of said elevator means completing the cycle of elevator travel to said predetermined base position.

References Cited in the file of this patent

UNITED STATES PATENTS

| | | |
|---|---|---|
| 1,978,153 | Zabel | Oct. 23, 1934 |
| 2,309,730 | Hastings | Feb. 2, 1943 |
| 2,451,368 | White et al. | Oct. 12, 1948 |
| 2,691,448 | Lontz | Oct. 12, 1954 |
| 2,705,570 | Maissian | Apr. 5, 1955 |

FOREIGN PATENTS

| | | |
|---|---|---|
| 602,757 | Great Britain | June 2, 1948 |
| 747,605 | Great Britain | Apr. 11, 1956 |
| 1,064,420 | Germany | Aug. 27, 1959 |